Dec. 8, 1970 R. J. WALKER, JR 3,546,629
SELF-OSCILLATING SWEEP CIRCUIT USING HARMONIC RINGING IN FEEDBACK WINDING
Filed Sept. 18, 1968
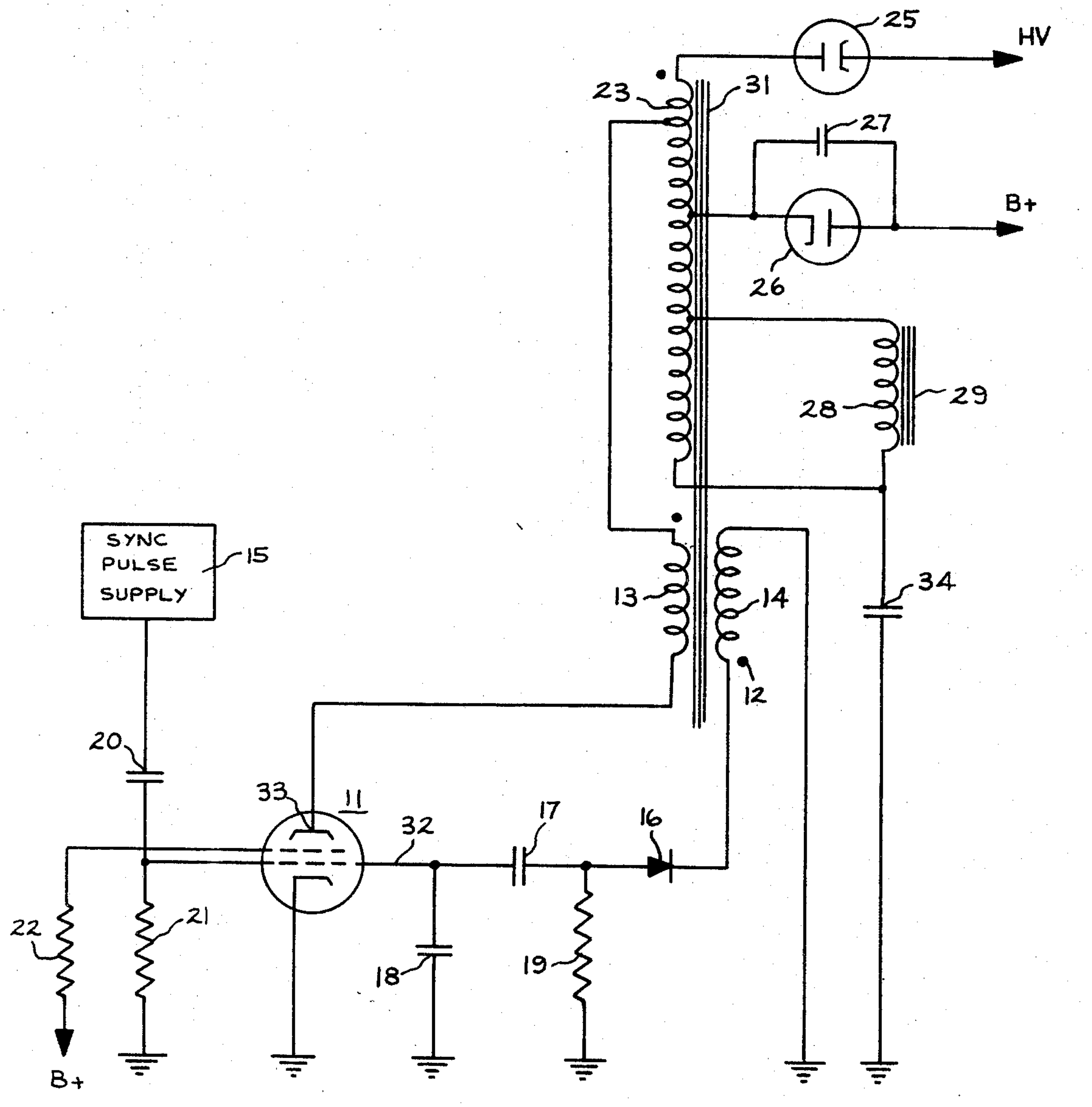
INVENTOR.
ROLLIE J. WALKER JR.
BY Francis DeBoos, Jr.
HIS ATTORNEY United States Patent Office 3,546,629
Patented Dec. 8, 1970

3,546,629

SELF-OSCILLATING SWEEP CIRCUIT USING HARMONIC RINGING IN FEEDBACK WINDING

Rollie J. Walker, Jr., Owensboro, Ky., assignor to General Electric Company, a corporation of New York Filed Sept. 18, 1968, Ser. No. 760,648
Int. Cl. H03k 4/34
U.S. Cl. 331—147 6 Claims

ABSTRACT OF THE DISCLOSURE

A self-oscillating horizontal sweep circuit comprising a vacuum tube with the primary of a feedback transformer coupled to the plate and to a horizontal sweep autotransformer. The primary of the feedback transformer and the autotransformer are wound on a single core along with a feedback transformer secondary which is coupled to the grid of the electron tube through a diode and a first capacitor. A second capacitor couples the grid to ground.

BACKGROUND OF THE INVENTION

This invention relates to a sweep circuit, and more particularly, it relates to a self-oscillating sweep circuit.

In the generation of a sawtooth wave form for deflection of the electron beam in a cathode ray tube, it has generally been the practice to utilize a synchronized oscillator for producing a sawtooth wave form and an amplifier for amplifying that wave form to a sufficient magnitude so that it may be used to deflect an electron beam in a cathode ray tube. As is quite apparent, it is necessary to employ two separate electron discharge devices, tubes or transistors, when a separate amplifier and a separate oscillator are utilized. However, it has been recognized, that this is not necessary to utilize separate electron discharge devices if both the function of oscillation and amplification are provided in a single electron discharge device.

One prior art sweep circuit combining both the amplification and oscillation functions in a single electron discharge device utilizes a flyback transformer wound with separate primary and secondary windings. The anode of a damper diode is coupled to the junction of the secondary and the yoke windings, which junction is remote from A-C ground, while the cathode is coupled to the junction of the primary and a capacitor. If the taps on the primary and secondary are properly chosen, the diode may be reversed biased near the end of trace thereby producing a negative pulse which may be fed back to the grid of the sweep tube to initiate retrace. However, this method of achieving a self-excited or a self-oscillating sweep amplifier does not lend itself to use in the autotransformer configuration found in today's television receivers. In particular, the autotransformer necessitates the connection of the damper diode anode to A-C ground thereby rendering the diode incapable of initiating retrace.

Consequently, in the latter case there was then employed an RC charging arrangements in the feedback path so as to achieve a regenerative self-excited amplifier. However, it is not a wholly satisfactory technique since a simple RC circuit is not sufficient to provide the appropriate linearity during trace and the abrupt drop during retrace so as to meet the scanning requirements in today's receivers. In other words, there was a certain inability to control the charging and discharging of the capacitor in the RC feedback path resulting in a less than ideal sawtooth wave shape.

The prior art circuits also had other difficulties. In many instances, it was difficult to maintain the proper bias on the amplifier without using a degenerative cathode resistor or an expensive bypass capacitor.

SUMMARY OF THE INVENTION

It is a first object of this invention to achieve a self-oscillating sweep circuit which could utilize an autotransformer as the output transformer.

It is a second object of this invention to achieve a self-oscillating sweep circuit wherein the sawtooth wave form is of an optimum shape.

It is a third object of this invention to achieve a self-oscillating sweep circuit which is economically advantageous.

In summary, in one embodiment of the invention, there is provided an improved sweep circuit for use in the deflection system of a cathode ray tube, the sweep circuit comprising an electron discharge device, a tuned output transformer coupled to the output of the electron discharge device, and tuned feedback winding means coupled to the output transformer and to the control electrode of the electron discharge device through a nonlinear resistive means. A capacitive charging means and a synchronous pulse producing means are also coupled to the control electrode of the electron discharge device.

BRIEF DESCRIPTION OF THE DRAWINGS

This specification concludes with claims particularly pointing out and distinctly claiming the subject matter which is regarded as the invention. The invention may also be understood from the following description taken in connection with the accompanying drawing which is a schematic diagram of an improved sweep circuit in accordance with this invention.

DESCRIPTION OF THE PREFERRED EMBODIMENT

The essence of the improved sweep circuit is the utilization of a particular feedback path for an electron discharge device 11. More specifically, the feedback path comprises a feedback winding means in the form of a feedback transformer 12 having a primary winding 13 and a secondary winding 14. The primary winding 13 and the secondary winding 14 are connected in the circuit with a reverse polarity and coupled for maximum high frequency response at the third harmonic ringing of the sweep transformer tertiary. This ringing of the feedback transformer 12 then provides a varying bias voltage to a nonlinear resistive means in the form of a diode 16 in the feedback path which in turn controls the charging and discharging of the capactitive means in the form of a capacitor 17 and a capacitor 18. The inclusion of capacitor 17 provides improved wave form control of the feedback signal, however it is not essential. Diode 16 may alternatively be connected directly to the connection of capacitor 18 and control electrode 32. The feedback path also includes a discharge resistor 19 and a second discharge and bias resistor 21 providing the desired wave form at the control electrode 32.

The remainder of the improved sweep circuit is somewhat conventional. More specifically, the synchronous pulse producing means 15 is coupled to the grid or control electrode 32 of the discharge device 11 through a capacitor 20. The bias on the screen of the discharge device 11 is maintained through a resistor 22 which is connected to the B+ power supply.

Similarly, the circuitry at the output transformer or autotransformer 23 is somewhat conventional except that coupling to the output or plate electrode 33 of the device 11 is made through the primary 13. The conventional high voltage rectifier 25 is connected at the top of the autotransformer 23 while the B+ damper diode 26, shunted by capacitor 27, is coupled to an intermediate point.

Finally, the deflection coils 28 are connected across a segment of the autotransformer 23 so as to provide a sawtooth magnetic flux in the yoke 29. As is customary, the deflection windings 28 are connected to ground through a deflection energy storage capacitor 34.

The operation of the sweep circuit is as follows. During retrace, the capacitors 17 and 18 are charged negatively so that the grid of the discharge device 11 is negative. As trace continues, the capacitors 17 and 18 will discharge to a greater degree through the resistor 19 and the resistor 21 and to a much lesser degree through the reverse biased diode 16 until the end of trace is approached, at which time the anode 33 will pass its maximum current. If the autotransformer 23 and the feedback transformer 12 are properly tuned so that the third harmonic ringing in the secondary 14 drives the cathode of the diode 16 negative with respect to the anode at the end of retrace, the diode will be forward biased and the regenerative nature of the feedback path will charge the capacitors 17 and 18 to a negative potential thereby effecting retrace. In addition, there may be some negative potential on the feedback secondary due to a di/dt contribution as the tube saturates at the end of trace. Of course, it is only necessary to depend upon the third harmonic ringing to self-excite the discharge device 11 in the absence of a negative going pulse from the sync pulse producing means 15. If the pulse from the sync pulse producing means 15 is present and sufficiently early to precede the negative going ringing at the end of the trace, the grid will be driven negative thereby producing the positive pulse in the plate 33 and feedback transformer primary 13 with a resulting negative pulse in the feedback transformer secondary 14 so as to forward bias the diode 16, charge the capacitors 17 and 18 to the appropriate negative potentials, thereby initiating retrace and ready the circuit for the next trace.

As should be appreciated, heavy reliance upon the ringing due to third harmonic tuning of a transformer may require very careful tuning of the transformer. In order to achieve this tuning, it has been found helpful to wind the primary of the feedback transformer 12 on a bobbin and subsequently coaxially wind the secondary 14 of the feedback transformer on the same bobbin. The bobbin may then be placed over one leg of the core 31 with the polarities shown or may be applied to a separate core. If a separate core is used, an additional damping diode should be associated with the tuned feedback transformer. This particular method of winding and coupling the feedback transformer 12 is cited merely as an example. Actually, it is possible to utilize a single winding, analagous to the secondary 14, and to direct couple the plate 33 of the discharge device 11 to the autotransformer 23.

I claim:

1. A self-oscillating sweep circuit comprising:

an electron discharge device having an input electrode and an output electrode;

a sweep transformer coupled to said output electrode;

feedback winding means comprising a transformer including a primary winding and a secondary winding, said primary winding being closely coupled to said secondary winding, said primary winding being connected between the output of said discharge device and said sweep transformer;

capactive means coupled to said input electrode;

means for supplying synchronizing pulses to said input electrode; and nonlinear resistive means coupled between said secondary winding of said feedback winding means and said capacitive means, said nonlinear resistive means serving as a charging path for said capacitive means with or without a sync pulse.

2. The apparatus as recited in claim 1 wherein said secondary winding is wound coaxially with said primary winding and with a reversed polarity coupling.

3. The apparatus as recited in claim 2 wherein said sweep transformer and said feedback winding means have a common core.

4. The apparatus as recited in claim 1 wherein said nonlinear resistive means comprises a diode.

5. The apparatus as recited in claim 4 wherein said feedback winding means and said sweep transformer are wound on a common core.

6. A self-oscillating sweep circuit comprising:

an electron discharge device having an input electrode and an output electrode;

a sweep transformer coupled to said output electrode;

capacitive means coupled to said input electrode;

nonlinear resistive means having a first and a second end, said first end being connected to said input electrode; and a feedback winding inductively coupled to said sweep transformer, one of said feedback winding being connected to said second end of said nonlinear resistive means, said nonlinear resistive means and said feedback winding comprising a charging path for said capacitive means.

References Cited

UNITED STATES PATENTS 2,926,284 2/1960 Finkelstein et al. ____ 328—181X
3,340,423 9/1967 Doland ____________ 315—19X ROY LAKE, Primary Examiner S. H. GRIMM, Assistant Examiner U.S. Cl. X.R.

315—29; 328—181; 331—148, 149, 151, 172